April 1, 1930. A. R. STEVENSON, JR 1,752,932
STARTING SYNCHRONOUS MOTORS
Filed March 3, 1925
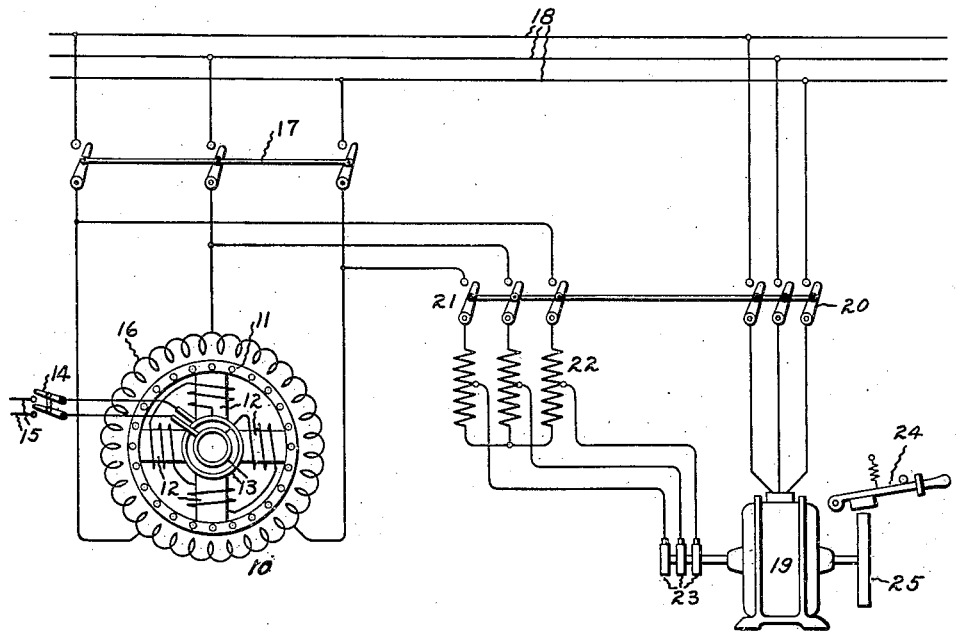
Inventor:
Alexander R. Stevenson Jr.
by
His Attorney.

Patented Apr. 1, 1930

1,752,932

UNITED STATES PATENT OFFICE

ALEXANDER R. STEVENSON, JR., OF SCHENECTADY, NEW YORK, ASSIGNOR TO GENERAL ELECTRIC COMPANY, A CORPORATION OF NEW YORK

STARTING SYNCHRONOUS MOTORS

Application filed March 3, 1925. Serial No. 12,921.

This invention relates to the control of electric motors, and more particularly to the control of alternating current synchronous motors, and has for its object the provision of an improved method and apparatus for starting and accelerating synchronous motors to their synchronous running speeds.

The difficulty of starting and accelerating a synchronous motor to its synchronous running speed is a well known inherent characteristic of this type of electrical machine, and is due to the fact that the synchronous torque of the motor is of practically negligible value except when the motor is running at synchronous speed. Heretofore it has been proposed to start and accelerate the rotatable member of synchronous motors to substantially synchronous speed from a source of constant frequency by employing auxiliary power means, such as an induction motor or the like. Also, it has been proposed that the normally stationary member of the motors be rotatably mounted and provided with a suitable braking mechanism to permit rotation thereof at synchronous speed before applying the braking mechanism to gradually decrease the speed and thereby start and gradually accelerate the normally rotating member of the synchronous motor. But the difficulty ordinarily has been overcome in practice by designing the synchronous motor so that it may be started and accelerated to substantially synchronous speed from a source of constant frequency as an induction motor. When the synchronous motor is of the usual type having direct current field poles, the field poles are provided with an auxiliary short circuited or amortisseur winding to enable the synchronous motor to start and accelerate to substantially synchronous speed as an induction motor before the direct current field poles are excited to operate the motor at synchronous speed. However, if the induction windings of a synchronous motor of the above character are designed to give a starting torque of relatively high value, the torque gradually will decrease as the motor accelerates, while if the motor is designed to have a relatively high accelerating torque at an intermediate speed near the synchronous speed, the starting torque necessarily is low. In the first case the motor may fail to accelerate beyond a certain sub-synchronous speed while in the second case the motor may fail to start, particularly when the motor is required to start and accelerate under load. Hence, when it is desired to drive a load requiring a relatively high starting and accelerating torque such, for example, as a centrifugal fan, by an alternating current synchronous motor, the obvious limitations and disadvantages encountered in the use of the several expedients mentioned leave much to be desired.

In accordance with my invention the difficulty in starting and accelerating the synchronous motor is effectively overcome by providing the motor with induction means suitably designed to afford a sufficiently high starting torque to insure starting of the load when the motor is energized with current of the normal constant frequency of the source from which the motor is to be operated at synchronous speed. In this way the motor is started and accelerated to a certain sub-synchronous speed. In order to accelerate the motor from this sub-synchronous speed to substantially synchronous speed I provide, in accordance with the preferred form of my invention, suitable frequency changing means such, for example, as a phase-wound induction motor and arrange to energize the synchronous motor from the secondary windings of the induction motor with the primary windings of the latter energized from the normal source of constant frequency. By gradually decreasing the speed of rotation of the induction motor, the synchronous motor is supplied with an energizing current of gradually increasing frequency which serves to bring the synchronous motor up to substantially synchronous speed when the induction motor is brought to rest. The synchronous motor then may be reconnected to the source of constant frequency and operated at synchronous running speed.

For a better understanding of my invention, reference is had to the following description taken in connection with the accompanying drawing in which the single figure diagrammatically illustrates a control system for a synchronous motor embodying my invention in order to explain the principles thereof.

The novel features and combinations which I believe to be characteristic of my invention are pointed out with particularity in the appended claims.

Referring to the drawing, it will be seen that the motor 10 is of the ordinary three phase alternating synchronous type having amortisseur windings 11 associated with the rotating field poles 12 which are connected through the slip rings 13 and the switch 14 to be energized from suitable direct current supply lines 15.

It will be understood that the shaft of synchronous motor 10 is connected to drive load apparatus, such for example as a centrifugal fan, not shown in the drawing. The amortisseur windings 11 of synchronous motor 10 are designed to have sufficiently high resistance to insure starting of the load driven by the motor when the primary windings 16 thereof are supplied with energizing current of substantially constant frequency through the line switch mechanism 17 from the three phase alternating current supply lines 18. However, due to the high resistance of the amortisseur windings 11 the torque of synchronous motor 10 will decrease as the motor accelerates until a predetermined sub-synchronous speed is reached at which the motor torque is just sufficient to operate the load.

In order to energize motor 10 with a current of varying frequency to accelerate the motor from the sub-synchronous speed to substantially synchronous speed in accordance with my invention, suitable frequency changing means, such as the three phase, slip ring induction motor 19 is arranged to be connected to the constant frequency supply lines 18 through the switch mechanism 20 and to the primary winding 16 of motor 10 through the switch mechanism 21. The switch mechanisms 20 and 21 may be mechanically interlocked as indicated in the drawing so as to be simultaneously operated to and from the circuit closing position if desired. A transformer 22, which may be of the auto transformer type shown in the drawing, preferably is connected to the secondary windings of induction motor 19 through the slip rings 23 in order to increase the voltage of the energizing current supplied to the synchronous motor 10 when the switches 20 and 21 are closed. The frequency of the energizing current supplied to synchronous motor 10 is varied by regulating the speed of rotation of induction motor 19 through the agency of the manually operated friction brake 24 or by other suitable speed controlling means. The brake 24 is suitably biased to the release position in which it is shown and is operable into frictional engagement with the braking drum 25 mounted upon the shaft of induction motor 19.

With the direct current supply lines 15 and the alternating current supply lines 18 suitably energized, the alternating current synchronous motor 10 is started and accelerated to synchronous running speed in the following manner. With the field switch 14 in the open position as shown the primary windings 16 of motor 10 are energized from the constant frequency supply lines 18 upon closure of line switch 17 and through inductive or transformer action produce a current in the high resistance amortisseur windings 11 sufficient to insure starting the motor 10 under all ordinary conditions of load. As the motor 10 starts and accelerates to a predetermined sub-synchronous speed, which is dependent upon the resistance of amortisseur windings 11 and the torque required by the load, the torque of motor 10 decreases to the value which is sufficient merely to continue operation of the load driven by the motor at the predetermined sub-synchronous speed.

To continue acceleration of motor 10 to substantially synchronous speed in accordance with my invention, the line switch 17 is opened and the switches 20 and 21 are at once closed. Thereafter, the field switch 14 is closed to energize the field poles 12 of synchronous motor 10 from the source of direct current 15. It will be understood that upon closure of switches 20 and 21 the secondary member of induction motor 19 begins to rotate and accelerates to the speed at which the frequency of the current induced therein is just sufficient to operate the synchronous motor 10 synchronously at the predetermined sub-synchronous speed previously mentioned. It will be evident that upon excitation of field poles 12 the synchronous motor 10 is locked in step with the frequency induced in the secondary winding of induction motor 19. Under these conditions application of friction brake 24 serves to decrease the speed of rotation of induction motor 19 and thereby correspondingly increasing the frequency of the current induced in the secondary winding thereof. This serves to gradually accelerate the motor 10 until finally substantially synchronous running speed is attained when the application of friction brake 24 brings the secondary member of induction motor 19 to rest. Preferably the induction motor should be brought to rest in such a position that the phase angles on both sides of switch 17 will be substantially the same.

With the synchronous motor 10 running at exactly synchronous speed the switches 20 and 21 are opened and the line switch 17 is immediately closed to energize synchronous motor 10 from the constant frequency supply line 18. If the phase angles are right, switch 17 could be closed before opening switches 20 and 21. The energizing current supplied from the three phase supply lines 18 to synchronous motor 10 serves to pull the latter into step with the frequency of the supply lines and thereafter the motor 10 continues to operate at synchronous running speed.

In starting and accelerating the synchronous motor 10 in the manner previously set forth, it will be observed that at no time is an excessive current drawn from the supply lines 18. Furthermore, the power factor of the current drawn from the supply lines 18 may be maintained at a relatively high value by suitably controlling the excitation of the direct current field poles 12 of synchronous motor 10 after the latter has accelerated to the predetermined sub-synchronous speed. Due to the relatively high power factor, it will be evident that the induction motor 19 may be of comparatively small capacity and still serve to effectively accelerate a synchronous motor of much larger capacity.

In accordance with the provisions of the patent statutes, I have described the principle of operation of my invention, together with the apparatus which I now consider to represent the best embodiment thereof, but I would have it understood that the apparatus shown is only illustrative and that the invention may be carried out by other means.

What I claim as new and desire to secure by Letters Patent of the United States, is:

1. The method of starting an alternating current synchronous motor having direct current field poles and amortisseur windings which consists in connecting the motor to a source of substantially constant frequency to accelerate the motor to a predetermined sub-synchronous speed, then energizing the motor from a source having a frequency such that the motor is operated substantially synchronously at said predetermined speed, then exciting the direct current poles of the motor to lock the same in step with said second source, then increasing the frequency of said second source until the motor is accelerated to substantially synchronous speed, with respect to said first source, and then reconnecting the motor with the field poles excited to said first source to operate the motor at synchronous speed.

2. The method of starting an alternating current synchronous motor having direct current field coils and amortisseur windings which consists in connecting the motor to a source of substantially constant voltage and frequency to accelerate the motor to a predetermined sub-synchronous speed, then energizing the motor from a source having a voltage and frequency such that the motor is operated substantially synchronously at said predetermined speed, then exciting the direct current poles of the motor to lock the same in step with said source, then simultaneously increasing the voltage and frequency of said second source until the motor is accelerated to substantially synchronous speed, with respect to said first source, and then reconnecting the motor with the field poles excited to said first source to operate the motor at synchronous speed.

3. The combination of an alternating current supply source of substantially constant frequency, an alternating current synchronous motor having direct current field poles and relatively high resistance amortisseur windings for supplying a relatively high torque for starting the motor under load and a lower torque for accelerating the motor under load to a sub-synchronous speed, a source of direct current for exciting said field poles, field switch mechanism for controlling the excitation of said field poles, line switch mechanism for connecting the motor to said source of substantially constant frequency to start and accelerate the motor under load to the said sub-synchronous speed with the direct current field poles unexcited and to operate the motor at synchronous speed when accelerated thereto with the direct current field poles excited, frequency changing means, switch mechanism for connecting said means to the source of substantially constant frequency and to said motor with the direct current field poles excited to lock the synchronous motor in step with said frequency changing means at said sub-synchronous speed, and means for controlling said frequency changing means to gradually increase the frequency supplied to said motor and thereby accelerating same from the said sub-synchronous to synchronous speed with the direct current field poles excited.

4. The combination of an alternating current source of substantially constant voltage and frequency, an alternating current synchronous motor having direct current field poles and relatively high resistance amortisseur windings for supplying a relatively high torque for starting the motor under load and a lower torque for accelerating the motor under load to a sub-synchronous speed, a source of direct current for exciting said field poles, field switch mechanism for controlling the excitation of said direct current field poles, line switch mechanism for connecting the synchronous motor to said source of substantially constant voltage and frequency to start and accelerate the motor under load to the said sub-synchronous speed with the direct current field poles unexcited, and to operate the motor under load at synchronous speed with the direct current field poles excited, a slip ring induction motor, a transformer connected to the secondary windings of the said induction motor for amplifying the voltage induced therein, switch mechanism for connecting the primary windings of said induction motor to the source of substantially constant voltage and frequency and for connecting the said transformer to the synchronous motor with the direct current field poles excited to lock the synchronous motor in step with the alternating current supplied from said transformer at said sub-synchronous speed, and means for gradually decreasing the speed of the said induction motor to correspondingly increase the voltage and frequency supplied to the synchronous motor and thereby accelerate the same from the said sub-synchronous to synchronous speed with the direct current field poles excited.

In witness whereof, I have hereunto set my hand this 2nd day of March, 1925.

ALEXANDER R. STEVENSON, Jr.